United States Patent Office 3,075,814
Patented Jan. 29, 1963

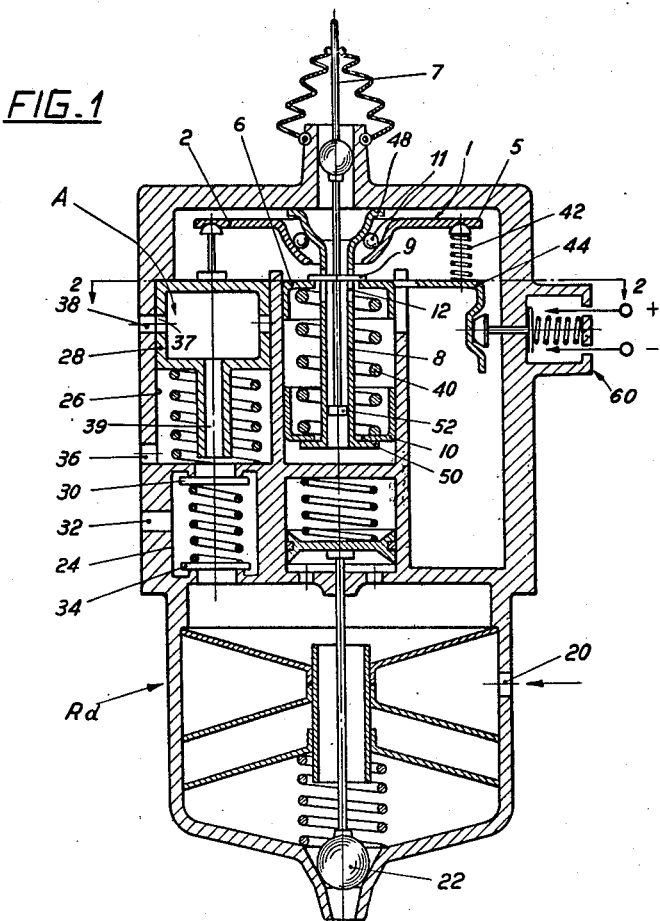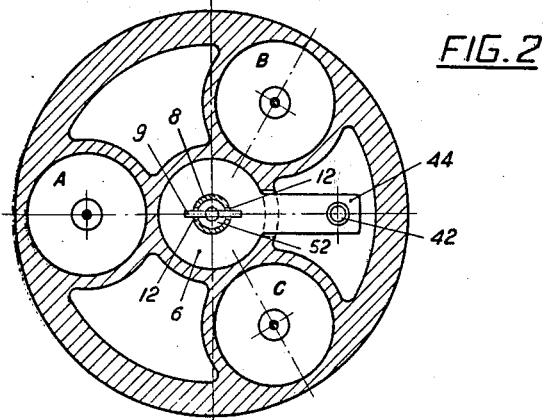

3,075,814
COMPRESSED AIR DISTRIBUTOR
Giuseppe Alfieri, Milan, Italy, assignor to Fabbrica
Italiana Magneti Marelli S.p.A., Milan, Italy, a firm
Filed Mar. 9, 1960, Ser. No. 13,911
Claims priority, application Italy Mar. 26, 1959
13 Claims. (Cl. 303—53)

The present invention relates to compressed air distrbutors having a plurality of sections in common with the air cleaning vehicle control unit, and particularly to distributors suited for use on heavy vehicles. More particularly, the distributors are of the type in which the air distributing cylinders are arranged symetrically around a main vertical axis, and the operation of each cylinder is obtained by means of a balancing element which is activated by a control spring which in turn is activated by a main control rod connected to the brake pedal.

Monobloc distributor assemblies having auxiliary signalling and control apparatus of the above-mentioned type, constitute the previous application for patent rights by Italian Patent No. 15,964 filed on October 25, 1958, and which is also in the name of the present applicant, the corresponding U.S. application being No. 845,149 filed October 8, 1959.

As described, the distributing sections are symmetrically arranged around the vertical axis of the apparatus, and the balancing element contains a number of extremities equal to the number of sections, and at least one of these extremities is subjected to the action of a timing device, which permits the advanced operation of the section in which it is in contact.

In such a manner therefore, braking initiation in the various sections occurs in succession, and finally all sections are operative at an elevated braking pressure.

In order to achieve such an operation, a spring, gradually is expanded during the braking operation, in such a manner as to gradually lose its advancing effect on the contacted section.

In the case of vehicles with trailers, it is possible to vary the trailer braking in relation to the motor vehicle.

It is an object of the invention therefore to anticipate the operation of a distributing section and to introduce the operation of the other sections at a subsequent time.

It is a further object of the invention to provide extreme sensitivity in the advanced operation of the distributing section and the subsequent operation of the other sections.

The device according to the invention is characterized by a balancing element which has a control extremity, and one or more further extremities. Each of the further extremities is subject to the action of a spring, initially disposed to develop a rotating effect on the balancing element with respect to the distributing section to be advanced. A control rod is provided and which is moved in accordance with the braking action. The control rod is coupled to one end of the spring through a rigid extremity on the rod. A sleeve is resiliently connected to the rod so that the sleeve is moved with the rod but through a reduced distance because of the resilient connection therebetween. The sleeve is connected to the balancing element through a pivotal connection so that when the sleeve and the rod undergo relative movement the spring is deformed and eventually reaches a position whereat the spring effect is nullified whereupon further movement of the control rod will cause uniform movement of the balancing element.

All other further particulars and characteristics will be illustrated and described in conjunction with the accompanying drawings, which are given only as an example, and refer to a three cylinder distributor in which one of the sections is shown advanced.

FIGURE 1 shows a side view in section of the distributor according to the invention and
FIGURE 2 shows a sectional view taken across line 2—2 of FIGURE 1.

The distributor houses the cleaning control unit Rd with an inlet 20 and an outlet drain valve 22. In the upper section of the distributor the distributing elements (sections) are situated with the balancing element 1, and the kinematic controls.

Three distributing sections are indicated at A, B, and C are symmetrically arranged at 120 angular intervals around the main vertical axis of the apparatus. Each section is essentially composed of an outer chamber 24 and a cylindrical chamber 26 in which piston 28 is adapted to reciprocate 26. Chambers 26 and 24 are connected by an inlet valve 30. Outer chamber 24 communicates with the cylinder tank and cleaner, and cylinder 26 is in contact with the section braking elements. During the exhaust phase chamber 26 is in contact with the atmosphere by means of a conduit 39 and exhaust parts 37 situated within piston 28.

Control spring 40 is centrally located in the distributor housing.

According to the present invention, the improvement in the distributor so far described is in the functioning of the balancing element, as well as the control thereof.

The balancing element 1, has three control extremities, one for each section, arranged in a star pattern, and between two consecutive control extremities, and opposite the section to be advanced.

Said extremity 5 is situated opposite the extremity 2 which controls piston 28 in chamber 26. The advancement of piston 28 in cylinder 26 is obtained by means of a preloaded spring 42 mounted between an extremity and extension 44 of upper support retainer cap 6 of control spring 40. Extension 44 is coincident in plan view with extremity 5. In the case of a triplex unit with two advanced sections, the other advancing extremity and corresponding retainer cap extension will be arranged between distributing sections A and B or distributing sections A and C. In the first instance tooth sections C and A will be advanced and in the second instance both sections B and A will be advanced.

The control according to the invention is essentially constituted by the main control means wherein push rod 7 acts on control spring 40, whereby reactor rod or sleeve 8 is subjected to the action of the control spring, which in turn acts on the balancing element 1.

Push rod 7 is connected to the brake pedal and employs an engager pin 9 which is supported on the upper retainer support cap 6. Spring 40 is supported at its upper end by support cap 6 and at its lower end by the lower retainer cap 10 which rests on seat 50. Seat 50 may be integral with rod or sleeve 8.

Sleeve 8 has a hollow body in which rod 7 is guided and moves. Sleeve 8 is shaped at the upper end for coupling, preferably through balls 11 to the balancing element 1 which it controls. Sleeve 8 is also furnished with appropriate recesses 12 in which the engager pin 9 can move, thereby compressing spring 40 and expanding spring 42.

During the working operations, movement of control rod 7 is transmitted to retainer cap 6 through pin 9. This causes compression of spring 40 and causes movement of sleeve 8. Sleeve 8 then exerts a force on balls 11 which is transmitted to balancing element. The advancement spring 42 coupled to extremity 5 of the balancing element, resists downward movement of extremity 5 to cause pivotal movement of balancing element 1 relative to sleeve 8 about balls 11 to cause initial displacement of extremity 2 of the balancing element 2 whereby an initial distribution of air is provided in section A. Successively, following the depression of control spring 40, the extremities 5 and 44 begin to separate causing spring 42 to expand and thereby reduce the resistance to displacement of extremity 5.

Spring 42 is of suitable strength so as to be relaxed at a particular output pressure of the distributing section so that upon further application of a braking force all sections will deliver the particular output pressure concurrently. It is obvious, that if two sections are to be advanced simultaneously, the advancement springs would be mounted in such a manner to obtain the advancement sequence, and thus the braking action required.

The operation of the apparatus is as follows:

Push rod 7 is moved in the interior of sleeve 8 upon the application of the brakes. Engager pin 9, integral with said push rod, moves therewith. The pin rests on cap 6 (provided with extension 44 which cap 6 encloses one end of spring 40, the other end being enclosed by cap 10 which rests on flange 50 which is integral with sleeve 8. The engager pin passes through longitudinal recesses 12 in sleeve 8.

The control of push rod 7 on balancing element 1 occurs in the following way: engager pin 9 acts on cap 6 of spring 40. The reaction of spring 40 on retaining cap 10 causes the displacement of sleeve 8 and therefore the displacement of the balancing element 1 which is pivotally connected to the upper part of sleeve 8 through balls 11.

The resilient connection accomplished by spring 40 between push rod 7 and sleeve 8 causes a relative displacement between these two members, which displacement is permitted by the provision of the sliding of the engager pin in recesses 12.

Advancement spring 42 causes, as balancing element 1 is moved, the rotation thereof about sleeve 8, thus determining the advanced operation of the distribution section A controlled by end 2 of the balancing element opposite extension 5. The action of spring 42 depends upon the distance between extremity 5 and extension 44; such distance being increased progressively upon the displacement of push rod 7 and the consequent compression of spring 40. By the relative movement of 5 and 5', there is a gradual decrease of the action of spring 42 upon the balancing element 1 whereby as the latter is displaced along the axis of sleeve 8 there is caused a gradual reduction in the angle of rotation thereof and finally when spring 42 is extended to an inoperative position, the balancing element will then move in a plane perpendicular to the push rod upon further movement of push rod 7.

Sequentially the operation is as follows:

As the brakes of the vehicle are applied rod 7 undergoes an initial displacement, cylinder A is then operated in advance of the other cylinders because of the action of balancing spring 42. As rod 7 is further displaced, extension 44 is moved therewith, said extension being moved at a greater rate than the balancing element 1 because of the compression of spring 40, this causes spring 42 to expand thereby reducing its advancing effect. Finally, a position of equilibrium is reached whereby the advancing effect is canceled and further movement of rod 7 will cause all cylinders to be activated simultaneously.

Another characteristic of the distributor according to the invention, is incorporated in the stop switch 60 operated by means of an appropriate shape or form given to the end of extremity 44.

Control of the switch is accomplished in such a manner, and is particularly suitable, inasmuch as, that through the action of spring 42, the extremity 44 is the first element which moves in the system, and therefore closure of the switch is effected as soon as the control push rod 7 begins to move.

What is claimed is:

1. A compressed air distributor comprising a body defining a plurality of chambers, displaceable control members for each chamber, a balancing lever including control extensions operatively associated with the control members to displace the same, means pivotally supporting the balancing lever to permit the extensions to engage said control members, control means resiliently connected to the latter said means to yieldingly displace the same along an axis and cause the extensions of the balancing lever to engage said control members, and resilient means between the balancing lever and the control means and offset from the axis of the means which supports the balancing lever so that movement of the balancing lever is eccentrically and yieldingly resisted by the resilient means whereby the balancing lever is caused to pivot upon initial movement of the control means so that engagement of one of the controlled extensions with the associated control member is advanced.

2. A distributor as claimed in claim 1 comprising spring means between the control means and the means pivotally supporting the balancing lever said control means comprises means coupled to said resilient means and spring means for gradually rendering the resilient means ineffective upon deformation of the spring means.

3. A distributor as claimed in claim 2, wherein the means pivotally supporting the balancing lever includes a sleeve and spherical bearing means encircling the sleeve and engaged against said balancing lever, said control members being arranged around said sleeve.

4. A distributor as claimed in claim 3, wherein said control means comprises a shaft concentric with the sleeve, said shaft and sleeve being adapted for limited axial displacement.

5. A distributor as claimed in claim 4 wherein the means for gradually rendering the resilient means ineffective is constituted by an extension supported on said sleeve and movable by said shaft, said resilient means being positioned between the last said extension and the balancing lever.

6. A compressed air distributor comprising means defining a plurality of chambers, a balancing lever including a control extremity for each chamber for operating the same, a further extremity on said balancing lever, a push rod movable in response to a braking operation, a movable sleeve, a spring coupling said sleeve and push rod together for relative movement to one another, said balancing lever being piovtally supported on said sleeve, an extremity operatively coupled to said push rod and aligned in spaced relation with said further extremity, a further spring between the latter extremities normally eccentrically resisting displacement of said further extremity of the balancing lever whereby advanced operation of at least one chamber is obtained upon movement of said push rod, the further spring being deformed upon relative movement between said sleeve and push rod to assume an inoperative position whereby further displacement of the push rod causes the free displacement of the balancing lever to cause operation of all chambers.

7. A compressed air distributor comprising a body defininng a plurality of chambers, displaceable control members for each chamber, a balancing element including extensions operatively associated with each of the control members to displace the same for operating the associated chamber, control means movable along an axis in response to a braking action, means coupled to the balancing element for displacing the same along said axis while permitting pivotal movement of the balancing element, elastic means coupling the control means and the last said means together to cause movement of said last means when the control means is axially displaced, a spring between the control means and the balancing element and located eccentrically relative to the axis of the balancing element for eccentrically resisting displacement of the balancing element whereby said balancing element is caused to pivot upon initial movement of the control means to cause at least one of the extensions to contact the control member associated therewith to operate the respective chamber, said spring being deformed upon relative movement of said control means and said last means to an inoperative position whereat further displacement of the control means causes the remaining extensions to contact the associated control members to operate the respective chambers.

8. A compressed air distributor as claimed in claim 7, wherein said chambers are symmetrically arranged about an axis and said control means comprises a shaft which is concentric with said axis and is movable therealong in response to a braking action.

9. A compressed air distributor as claimed in claim 8 wherein said control means comprises an extension adapted for movement with said shaft, said balancing element including an extension aligned and spaced from the extension of said control means said spring being coupled to the latter extensions to normally urge the same apart.

10. A compressed air distributor as claimed in claim 9, wherein the extension of the control means is coupled to the elastic means.

11. A compressed air distributor as claimed in claim 10, wherein the control means comprises an engager pin on said shaft for displacing said extension of the control means.

12. A compressed air distributor as claimed in claim 11, wherein the means pivotally coupled to the balancing element comprises a sleeve surrounding said shaft, said sleeve being provided with slots to enable passage therethrough of said engager pin.

13. A compressed air distributor as claimed in claim 9, wherein said elastic means is a spring surrounding said sleeve, said control means further comprising a retainer cap for said elastic means, an engager pin on said shaft and engageable with said retainer cap to displace the same, said extension of the control means being rigidly connected with the retainer cap.

References Cited in the file of this patent
UNITED STATES PATENTS
2,329,742    Bush et al. _____ Sept. 21, 1943